United States Patent
Stuart et al.

(10) Patent No.: US 7,229,288 B2
(45) Date of Patent: Jun. 12, 2007

(54) METHOD, SYSTEM, AND PROGRAM FOR USING A VIRTUAL ENVIRONMENT TO PROVIDE INFORMATION ON USING A PRODUCT

(75) Inventors: Steven Stuart, Hollywood, CA (US); Terry Zierenberg, Mission Hills, CA (US); Fabio Gratton, San Clemente, CA (US)

(73) Assignee: Medtronic Minimed, Inc., North Ridge, CA (US)

( * ) Notice: Subject to any disclaimer, the term of this patent is extended or adjusted under 35 U.S.C. 154(b) by 554 days.

(21) Appl. No.: 10/326,538

(22) Filed: Dec. 20, 2002

(65) Prior Publication Data

US 2004/0121295 A1 Jun. 24, 2004

(51) Int. Cl.
*A63F 13/00* (2006.01)
*G06F 9/24* (2006.01)
*G09B 19/00* (2006.01)
*G09B 9/00* (2006.01)

(52) U.S. Cl. ............... 434/262; 434/236; 434/243; 463/1

(58) Field of Classification Search ............ 434/262, 434/236
See application file for complete search history.

(56) References Cited

U.S. PATENT DOCUMENTS

| | | | |
|---|---|---|---|
| 5,307,263 A | 4/1994 | Brown | |
| 5,569,212 A | 10/1996 | Brown | |
| 5,628,309 A | 5/1997 | Brown | |
| 5,665,065 A * | 9/1997 | Colman et al. | 604/66 |
| 5,678,571 A * | 10/1997 | Brown | 128/898 |
| 5,704,922 A | 1/1998 | Brown | |
| 5,720,733 A | 2/1998 | Brown | |
| 5,730,654 A | 3/1998 | Brown | |
| 5,782,814 A | 7/1998 | Brown et al. | |
| 5,792,117 A | 8/1998 | Brown | |
| 5,813,863 A * | 9/1998 | Sloane et al. | 434/236 |
| 5,822,715 A | 10/1998 | Worthington et al. | |
| 5,828,943 A | 10/1998 | Brown | |
| 5,879,163 A | 3/1999 | Brown et al. | |
| 5,887,133 A | 3/1999 | Brown et al. | |
| 5,897,493 A | 4/1999 | Brown | |
| 5,899,855 A | 5/1999 | Brown | |
| 5,913,310 A | 6/1999 | Brown | |
| 5,918,603 A | 7/1999 | Brown | |

(Continued)

OTHER PUBLICATIONS

"The Sims: A World Unto Its Own", The Sims, 2000 Electronic Arts Inc., http://www.replacementdoc.com.*

(Continued)

*Primary Examiner*—Robert P. Olszewski
*Assistant Examiner*—Aileen Chyn
(74) *Attorney, Agent, or Firm*—David W. Victor; Konrad Raynes & Victor LLP

(57) ABSTRACT

Provided are a method, system, and program for providing information on a promoted product to a user. A virtual environment is rendered and a virtual customer is rendered within the virtual environment, wherein the virtual customer utilizes the promoted product by receiving input control signals from the user indicating movement of the virtual customer through the virtual environment. Interactions are rendered between the virtual customer and the virtual environment in response to the input control signals to enable the user to virtually experience how the promoted product is capable of impacting daily activities of the user and to promote the product.

42 Claims, 12 Drawing Sheets

U.S. PATENT DOCUMENTS

| | | |
|---|---|---|
| 5,933,136 A | 8/1999 | Brown |
| 5,940,801 A | 8/1999 | Brown |
| 5,951,300 A | 9/1999 | Brown |
| 5,956,501 A | 9/1999 | Brown |
| 5,960,403 A | 9/1999 | Brown |
| 5,985,559 A | 11/1999 | Brown |
| 5,997,476 A | 12/1999 | Brown |
| 6,023,686 A | 2/2000 | Brown |
| 6,032,119 A | 2/2000 | Brown et al. |
| 6,101,478 A | 8/2000 | Brown |
| 6,113,578 A | 9/2000 | Brown |
| 6,144,837 A | 11/2000 | Quy |
| 6,151,586 A | 11/2000 | Brown |
| 6,161,095 A | 12/2000 | Brown |
| 6,167,362 A | 12/2000 | Brown et al. |
| 6,168,563 B1 | 1/2001 | Brown |
| 6,186,145 B1 | 2/2001 | Brown |
| 6,210,272 B1 * | 4/2001 | Brown ............... 463/1 |
| 6,233,539 B1 | 5/2001 | Brown |
| 6,246,992 B1 | 6/2001 | Brown |
| 6,248,065 B1 | 6/2001 | Brown |
| 6,260,022 B1 | 7/2001 | Brown |
| 6,270,455 B1 | 8/2001 | Brown |
| 6,334,778 B1 | 1/2002 | Brown |
| 6,368,111 B2 * | 4/2002 | Legarda ............... 434/236 |
| 6,368,273 B1 | 4/2002 | Brown |
| 6,375,469 B1 | 4/2002 | Brown |
| 6,379,301 B1 | 4/2002 | Worthington et al. |
| 6,381,577 B1 | 4/2002 | Brown |
| 6,425,764 B1 * | 7/2002 | Lamson ............... 434/236 |
| 6,561,811 B2 * | 5/2003 | Rapoza et al. ............... 434/236 |
| 6,918,769 B2 * | 7/2005 | Rink ............... 434/247 |
| 6,968,375 B1 | 11/2005 | Brown |
| 2003/0014423 A1 * | 1/2003 | Chuah et al. ............... 707/102 |
| 2005/0226918 A1 * | 10/2005 | MacDonald ............... 424/449 |

OTHER PUBLICATIONS

Ajami, Amer. "America's Army: Operations Preview", *Game Spot*, [online], Jul. 2, 2002, [Retrieved on Nov. 24, 2002]. Retrieved from the Internet at <URL: http://gamespot.com/gamespot/filters/printerfriendly/0,10855,2873293-1,00.html>.

Olympian, The. "Army Combat Video Game Sets Sights on Recruiting Computer-Savvy Teens", *The Olympian,* [online], Sep. 7, 2002, [Retrieved on Nov. 24, 2002]. Retrieved from the Internet at <URL: http://www.theolympian.com/home/news/20020907/frontpage/45691_Printer.shtml>.

Osborne, Scott. "America's Army: Operations Review", *Game Spot,* [online], Oct. 23, 2002, [Retrieved on Nov. 24, 2002]. Retrieved from the Internet at <URL: http://gamespot.com/gamespot/filters/printerfriendly/0,10855,289524-1,00.html>.

Starbright Foundation. "Starbright Life Adventure Series: Diabetes CD-ROM." [CD-ROM], © 1998 Starbright Foundation and its Licensors. Computer game on CD-ROM.

U.S. Army. "U.S. Army Distributes America's Army: Operations PC Game Discs", [online], Press Release, Oct. 9, 2002, [Retrieved on Nov. 24, 2002]. Retrieved from the Internet at <URL: http://biz.yahoo.com/bw/021009/92456_1.html>.

U.S. Army. "Armygame Project History". *Americasarmy.com,* [online], 2002, [Retrieved on Nov. 24, 2002]. Retrieved from the Internet at <URL: http://www.thearmygame.com/history.html>.

U.S. Army. "Welcome to the Armygame Project Press Release Site!". *Americasarmy.com,* [online], 2002, [Retrieved on Nov. 24, 2002]. Retrieved from the Internet at <URL: http://www.thearmygame.com/>.

* cited by examiner

METHOD, SYSTEM, AND PROGRAM FOR USING A VIRTUAL ENVIRONMENT TO PROVIDE INFORMATION ON USING A PRODUCT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related to a method, system, and program for using a virtual environment to provide information on using a product.

2. Description of the Related Art

Certain products have the ability to alter a person's lifestyle and quality of life. For instance, medical devices may relieve a person's suffering from a medical condition and prevent the condition from interfering with the person's daily life. One such lifestyle altering medical device is an insulin pump used by diabetics, such as the insulin pumps manufactured by Medtronic Minimed, Inc. An insulin pump comprises a small portable unit, similar in size to an electronic pager, that is fastened to the patient's belt or clothing. The pump delivers micro-drops of a fast-acting insulin throughout the day at an insertion site on the patient's body. With an insulin pump, the diabetic does not need daily insulin injections. Further, the insulin pump includes readily accessible controls that the diabetic may easily use to adjust the dispensing of insulin before engaging in an activity that may affect the blood-sugar level. The insulin pump provides the diabetic the freedom to eat, exercise and engage in various life activities at-will when and where they want.

One challenge for product marketers is to convey to potential customers the benefits of such a lifestyle altering product. Marketers have numerous ways to communicate information, such as brochures or advertisements describing technical details of the product, satisfied customer testimonials, etc. However, these prior art marketing techniques are typically inadequate to provide the target customer with an understanding of how the promoted product can dramatically impact and improve the daily life of the target customer.

Medical device distributors have provided customers with computer games to educate the customer on a particular product or therapy. Although such computer games use an interactive entertainment medium to inform patients of a therapy or medical product, especially adolescent patients, such games are generally limited to using entertainment activities to provide information during the course of the game play. Such computer game oriented marketing efforts are often inadequate to convey to the potential customer an understanding of how the medical device or therapy will dramatically improve the customer's quality of life and lifestyle.

Notwithstanding prior art techniques for communicating product information to potential markets and customers, there is a need in the art for improved techniques for making potential customers aware of the lifestyle and quality of life changes that will be realized from a particular medical therapy or product.

SUMMARY OF THE PREFERRED EMBODIMENTS

Provided are a method, system, and program for providing information to a user on a medical therapy to treat a medical condition. A virtual environment is rendered and a virtual patient is rendered within the virtual environment, wherein the virtual patient is receiving the medical therapy. Input control signals are received from the user indicating movement of the virtual patient through the virtual environment. Interactions are rendered between the virtual patient and the virtual environment in response to the input control signals to enable the user to virtually experience how the medical therapy is capable of impacting daily activities of the user and to promote the medical therapy.

In further implementations, rendering the virtual environment includes rendering daily activities the user would experience when receiving the medical therapy.

In yet further implementations, the medical therapy may involve use of a medical device to dispense medication. In such case, a representation of the medical device is rendered and input control signals are received from the user to dispense medication from the medical device when the virtual patient is interacting in the virtual environment.

Still further, rendering interactions between the virtual patient and the virtual environment may further comprise rendering interactions between the virtual patient and a virtual person rendered in the virtual environment to provide the user further information on the medical therapy, wherein the virtual person is not controlled by the user.

Yet further, the virtual person may be receiving an alternative medical therapy to treat the medical condition, wherein the rendered interactions between the virtual person and the virtual patient are used to convey information contrasting the alternative medical therapy the virtual person is receiving to the medical therapy the virtual patient is receiving.

Further provided are a method, system, and program for providing information to a user on a promoted product. A virtual environment is rendered and a virtual customer is rendered within the virtual environment, wherein the virtual customer utilizes the promoted product by receiving input control signals from the user indicating movement of the virtual customer through the virtual environment. Interactions are rendered between the virtual customer and the virtual environment in response to the input control signals to enable the user to virtually experience how the promoted product is capable of impacting daily activities of the user and to promote the product.

In further implementations, rendering the virtual environment includes rendering daily activities the user would experience when using the promoted product.

The described implementations provide techniques for rendering a virtual environment with a computer type device that is intended to convey to a user of the computer type device the lifestyle impact and benefits of a new product, service, medical therapy, medical product, etc., being promoted Described implementations enable the user to control actions of a virtual character in the virtual environment in a manner that allows the user to experience virtually the advantages of the promoted item.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
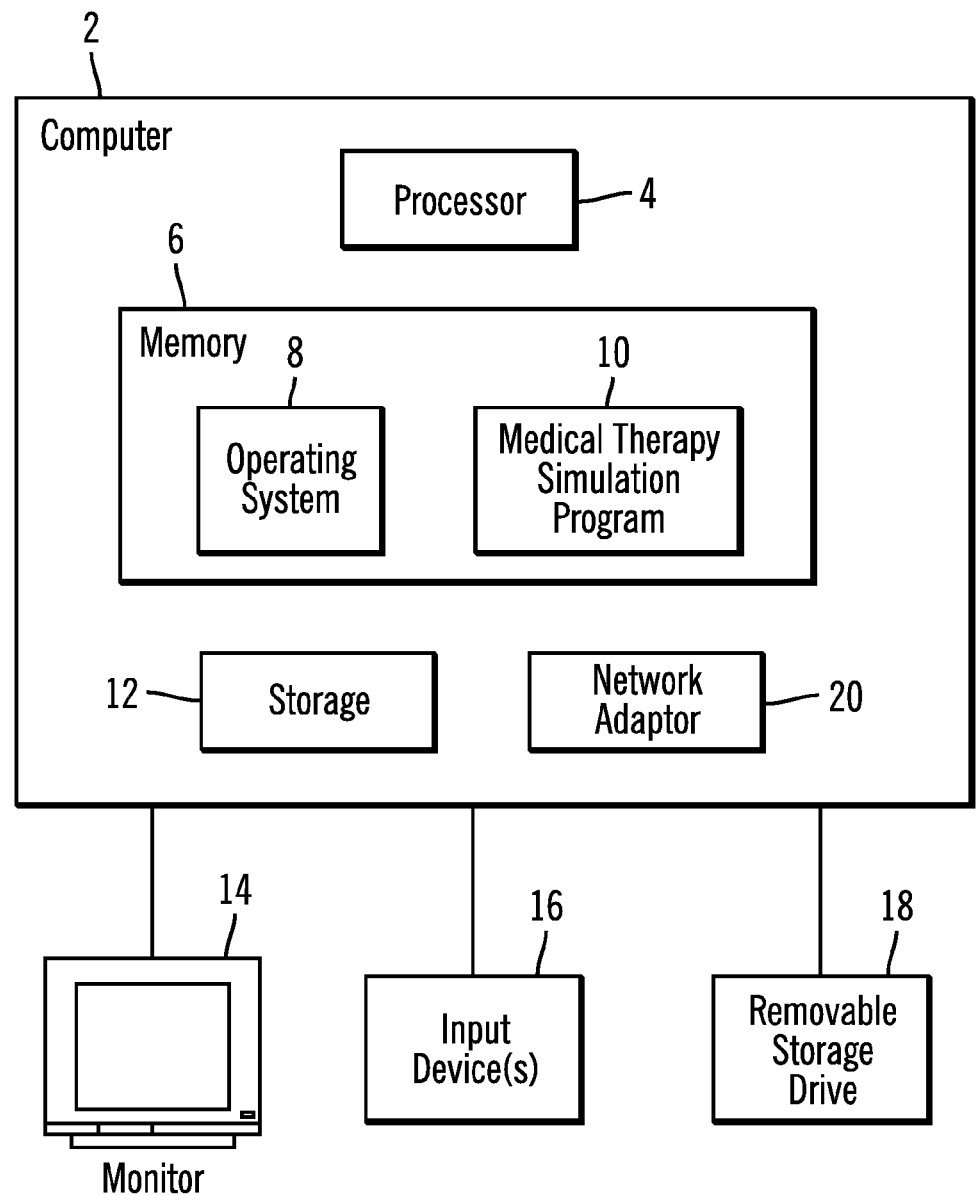
FIG. 1 illustrates a computing environment in which aspects of the invention are implemented.

FIG. 1 illustrates a computing environment in which aspects of the invention are implemented. A computer 2 includes a processor 4 and memory 6 in which the processor 4 executes an operating system 8 and medical therapy simulation (SIM) game 10. The computer 2 further includes a non-volatile storage device 12 including programs, such as the operating system 8 and medical therapy simulation program 10, that the processor 4 loads into the memory 6 to execute. The processor 4 may further swap programs and parts thereof between the memory 4 and storage 12 in a manner known in the art. The memory 6 may comprise a high-speed volatile memory device and the storage 12 may comprise a non-volatile storage device. A computer display monitor 14 is coupled to the computer 2 to receive and render video information from the processor 2 in response to executing the medical therapy simulation program 10. One or more input devices 16 (e.g., keyboard, mouse, pen stylus, microphone, touch screen display, etc.) are coupled to the computer 2 to enable the user to communicate data input to the computer 2. A removable storage drive 18 is coupled to the computer 2 and capable of receiving a removable storage medium, such as an optical disk (e.g., CD ROM, DVD, etc.), removable magnetic disk or drive, cartridge, etc. A network adaptor 20 enables the computer 2 to communicate over a network. The medical therapy simulation program 10 may be provided to the computer 2 from a removable storage medium (not shown) coupled to the storage drive 18 or downloaded from a remote computer over a network (not shown) via a network adaptor 20.

The computer 2 may comprise any computing device known in the art capable of executing the simulation program 10, such as a server, workstation, desktop, hand held computer, laptop, telephony device, network appliance, game console, e.g., Game Boy®, Xbox™, PlayStation®, Gamecube™, etc. (Game Boy is a registered trademark and Gamecube is a trademark of Nintendo of America, Inc.; Xbox is a trademark of Microsoft Corporation; PlayStation is a registered trademark of Sony Corporation). The operating system 8 may comprise a general purpose operating system designed to run many different types of programs or a special purpose operating system designed for executing games within a game console.

In described implementations, the simulation program 10 generates and renders a virtual environment that is intended to convey to the program user the lifestyle impact and benefits of a new product, service, medical therapy, medical product, etc. In implementations used to promote medical products, the user of the simulation program 10 controls the movement and actions of a virtual patient having the medical condition in a virtual environment to allow the program user to experience virtually the advantages of the medical therapy and how the medical therapy will improve the lifestyle and quality of life of the program user. The program user is likely a sufferer of the medical condition and should immediately understand the implications for themselves of the new therapy when virtually experiencing the benefits through their control of the virtual patient in the virtual environment.

Figure 2:
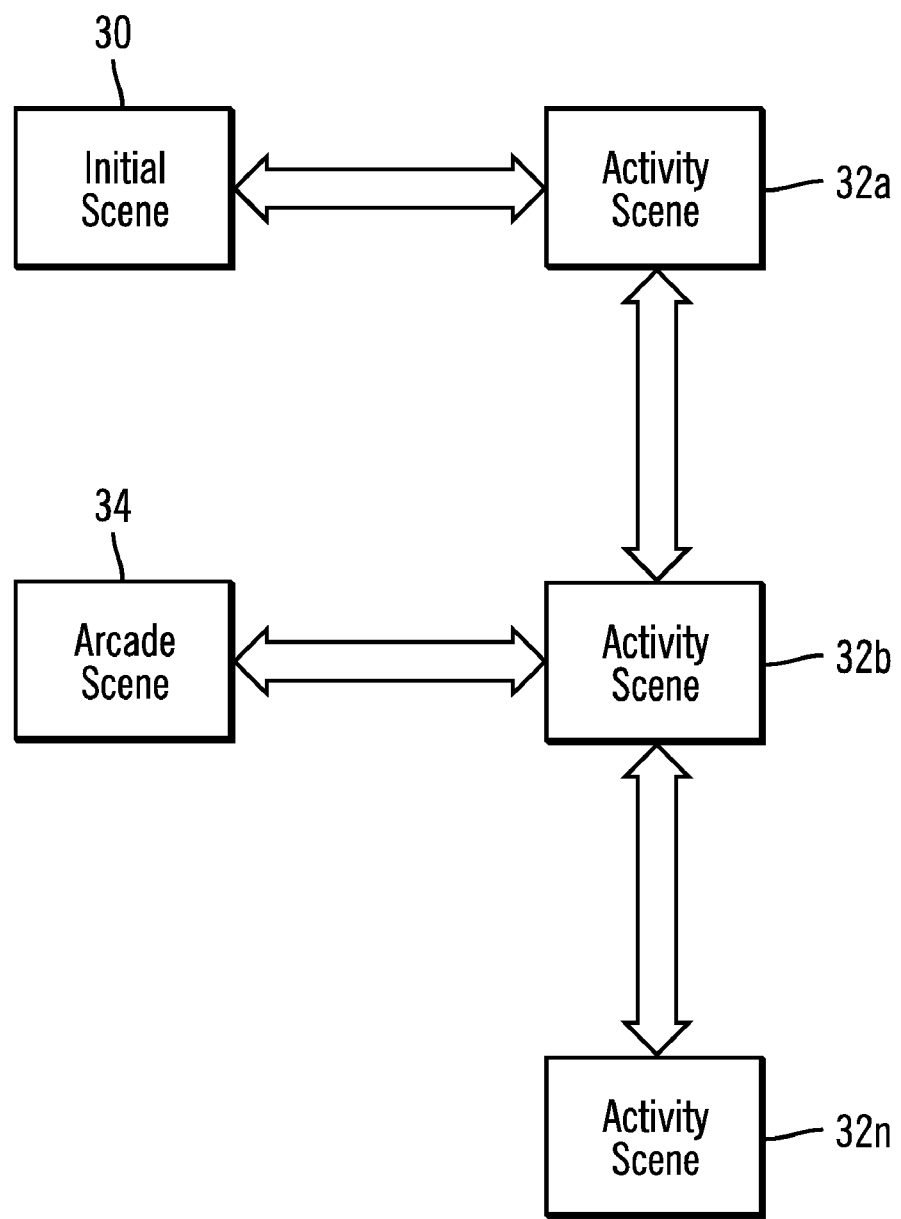
FIG. 2 illustrates a flow of scenes that are presented in a virtual environment in which a virtual patient having a medical condition interacts in accordance with implementations of the invention.

To enable the program user to virtually experience the benefits of a medical therapy, the simulation program 10 may render a series of scenes within the virtual environment in which the virtual patient interacts. The virtual patient may be presented in a first person perspective or a third person perspective where the virtual patient is shown moving through the virtual environment. FIG. 2 illustrates a flow of scenes generated and rendered by the simulation program 10 in which the user may interact as a virtual patient suffering from the medical condition and using the medical therapy that is being promoted in the simulation program 10. In an initial scene 30, the program user would control the virtual patient to gather any medical components used as part of the medical therapy and may dispense an initial treatment from the medical device. In this initial scene 30, general information may be provided on how to use the medical device and how to regulate the medical device throughout the day as part of the medical therapy. After orienting oneself during the initial scene 30, the user may use the input device(s) 16 to move the virtual patient through a plurality of activity scenes 32a, 32b . . . 32n in which the user controls the virtual patient and virtually experiences through the virtual patient how the medical therapy impacts routine daily activities rendered in the virtual environment that the program user is likely to experience during the day. Within certain of the activity scenes 32a, 32b . . . 32n, the program user may select or be directed to move to an arcade scene 34 in which the user will engage in some action game play, such as maneuvering the virtual patient around various objects and dangers that may be unrelated to the medical therapy and condition. The purpose of the arcade scenes 34 interspersed throughout the scenes is to provide entertainment to amuse the user and encourage further immersion in the simulation program 10.

Figure 3:
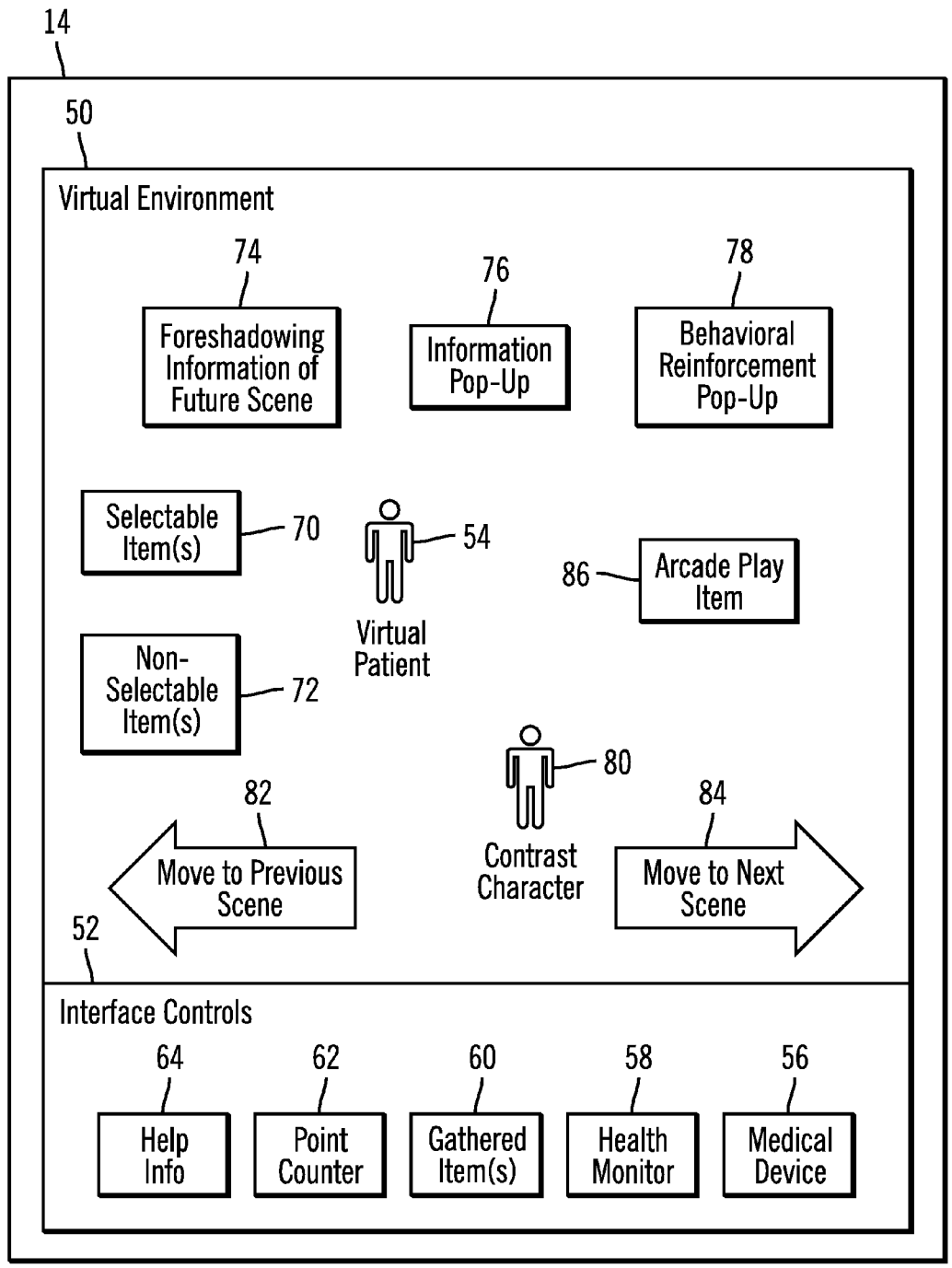
FIG. 3 illustrates a layout of the virtual environment and interface controls in accordance with implementations of the invention.

FIG. 3 illustrates a layout of a virtual environment 50 that the simulation program 10 renders in the display monitor 14. The virtual environment 50 may be rendered within each scene 30, 32a, 32b . . . 32n, 34 where each scene would include a different arrangement and presentation of the virtual environment 50. When rendering the virtual environment 50, the simulation program 10 renders an interface control 52 section displaying various controls the user may select, including graphical representations of a medical device 56, a health monitor 58, one or more gathered items 60, a point counter 62, and help information 64. A user enters input through the input device(s) 16 to control the simulation program 10 and move a displayed virtual patient 54 through the virtual environment 50 in the various scenes 30, 32a, 32b . . . 32n, 34.

The displayed medical device 56 provides a representation of the medical device that is used in the medical therapy being promoted in the simulation program 10. For instance, if the simulation program 10 is promoting insulin pump therapy for the treatment of diabetes, then the displayed medical device 56 would comprise an insulin pump. If the simulation program 10 is promoting a treatment for asthma, or any other disease treated by a dispensing mechanism, then the rendered medical device 56 would appear in the form of the dispensing device for dispensing medication to the user, such as an asthma inhaler, etc. The medical therapy simulation program 10 may render the medical device 56 in a manner such that user selection of the rendered medical device 56 may cause the simulation program 10 to further render and display medical device controls to allow the program user to dispense virtual medication. For instance, if the medical device 56 comprises an insulin pump, then user selection of the rendered medical device 56 may display pump controls to allow the user to provide a bolus, which is an extra boost of insulin given to cover an expected rise in blood glucose (sugar), such as the rise that occurs after a meal, or adjust the basal rate, which is the rate at which the pump continually dispenses small amounts of insulin to the patient.

A health monitor 58 representation provides information on the virtual patient's 54 health state. The health state may comprise biometric data from the virtual patient 54 that is used in determining a state of the medical condition. For instance, if the patient 34 is a diabetic, then the biometric data gathered by the health monitor 58 may comprise the patient's 54 blood sugar level and the health monitor 58 may display information indicating whether a bolus or basal rate adjustment is necessary. If the medical therapy is related to asthma, then the biometric data may indicate the virtual patient's 54 peak flow levels. In diabetes related implementations, the health monitor 58 may comprise a blood/glucose meter and test strips and, in asthma related implementations, the health meter may comprise a peak-flow meter.

The representation of the gathered items 60 comprises a graphical representation of the items the virtual patient 54 collected when moving through the virtual environment 50 in different scenes 30, 32a, 32b . . . 32n, 34 (FIG. 2). The displayed gathered items 60 may comprise food, clothing, accessories, etc., that may be used by the patient 54 when moving through the different scenes. The interface controls 52 may further render a point counter 62 that displays a number of points the user has earned during the course of game play. An information 64 graphical icon represents a help feature, which the user may select to display additional help information, such as information on the medical therapy relevant to the virtual environment 50 in which the user is interacting. For instance, if the user is engaged in a specific activity, such as swimming, exercising, etc., then selection of the help information icon 54 may display information about how the medical therapy impacts or improves the patient's ability to engage in such activity being rendered in the virtual environment 50.

In each scene 30, 32a, 32b . . . 32n, and 34, the simulation program 10 may generate and render one or more of the elements shown in the virtual environment 50 (FIG. 3), including one or more selectable items 70, one or more non-selectable items 72, foreshadowing information for a future scene 74, an information pop-up 76, a behavioral reinforcement pop-up 78, a contrast character 80, and navigation icons 82 and 84 to enable the user to move the virtual patient 54 through scenes. A selectable item 70 comprises an item with which the patient 54 may interact. The interaction may comprise engaging in an activity, gathering an item to add to the gathered items 60, opening a drawer, door, etc. A non-selectable item 72 comprises a displayed element with which the patient 54 may not interact, such as background scenery. The virtual environment 50 may include various mechanisms to provide foreshadowing information for a future scene 74. For instance, the virtual patient 54 may be directed to a window, radio, television or conversation through which information on future scenes is provided, such as through a weather report. This information may be used to provide hints to the user on what particular items displayed in the virtual environment 50 should be gathered. Occasionally the simulation program 10 may generate and render an information pop-up 76 that displays relevant information concerning the medical therapy that is related to the virtual patient's 54 actions within the virtual environment 50. The simulation program 10 may output rendered information to the program user via a display monitor 14 or alternative output means, such as sound, etc. For instance, the information pop-up 76 may remind the user to use the health monitor 58 to measure a health state or dispense further medication from the displayed medical device 56. The information pop-up 76 may enable access to further information on the medical therapy being promoted by the simulation program 10.

A behavioral reinforcement pop-up 78 renders information communicating positive reinforcement when a user engages in a positive action, which may or may not be related to the medical therapy. For instance, if the user controls the virtual patient 54 to appropriately utilize the health monitor 58 and medical device 56, then the simulation program 10 may generate and render a behavioral reinforcement pop-up 78 to provide accolades for the user's actions. In certain implementations, if the user engages in self-initiated appropriate behavior without being prompted or reminded by the simulation program 10, then the simulation program 10 may generate and render the behavioral reinforcement pop-up 78 to notify the user of the positive behavior related to the application of the promoted medical therapy. The positive behavior which triggers a behavioral reinforcement pop-up 80 may be related to using the medical device 56 and health monitor 58 as part of the medical therapy. Additionally, the positive behavior that triggers a behavioral reinforcement pop-up 78 may be entirely unrelated to the medical therapy. For instance, if the program user directs the virtual patient 54 to engage in general "good" actions, e.g., switch-off an electrical appliance to conserve electricity, pick-up trash, select healthy foods to eat, etc., then a behavioral reinforcement pop-up 78 may be displayed to acknowledge such "general" desirable behavior and the simulation program 10 may award points to increment the pointer counter 62.

In certain scenes 30, 32a, 32b . . . 32n (FIG. 2), the simulation program 10 may generate and render a contrast character 80 in the virtual environment 50. The contrast character 80 is a patient with the same medical condition as the virtual patient 54 but who is not on the promoted medical therapy that the virtual patient 54 is receiving. For instance, if the virtual patient 54 is using an insulin pump, then the contrast character 80 may be using a different insulin therapy, such as insulin injections. The virtual patient 54 may interact with the contrast character 80 to observe how the contrast character 80 is coping with the medical condition using the alternative medical therapy (e.g., insulin injections), which may be the therapy that the program user is currently receiving. The virtual patient 54 may interact with the contrast character 80 in a predefined dialog or in response to user controls. The contrast character 80 may communicate medical difficulties being experienced when attempting to participate in the activity scenes 32*a*, 32*b* . . . 32*n*.

The purpose of the contrast character 80 is to communicate and remind the program user of the differences between the old medical therapy (e.g., insulin injections) and the new medical therapy being promoted through the simulation program 10. The interactions between the virtual patient 54 and contrast character 80 allow the user to better understand the benefits of the promoted therapy to current therapies because the program user can observe and contrast how the virtual character 54 and contrast character 80 interact in the different activity scenes 32*a*, 32*b* . . . 32*n*. For instance, the virtual patient 54 may be able to switch to an activity like eating or strenuous exercise by merely adjusting the insulin pump device 56, whereas the contrast character 80 will decline to participate in such activity because of the limitations of the old therapy. The simulation program 10 thus reminds the program user of the limitations of the old therapy by presenting the contrast character's 80 limited participation in the activity scenes 32*a*, 32*b* . . . 32*n* versus the virtual patient's 54 more robust participation in such activities. In this way, the simulation program 10 enables the program user to virtually experience the improvements in the virtual patient's 54 quality of life in using the promoted medical therapy.

The virtual environment 50 may further render an arcade play item 86, which is a control that causes the simulation program 10 to generate and render the arcade scene 34 (FIG. 2) in which the program user engages in action oriented play, which may or may not be related to the medical therapy, such as a running, jumping, dodging action activity. The purpose of the arcade scene is to provide entertainment and amusement to entice continued play. Upon leaving the arcade scene 34, the virtual patient 54 would return to the activity scene 32*a*, 32*b* . . . 32*n* from which the arcade scene 34 was invoked.

Figure 4:
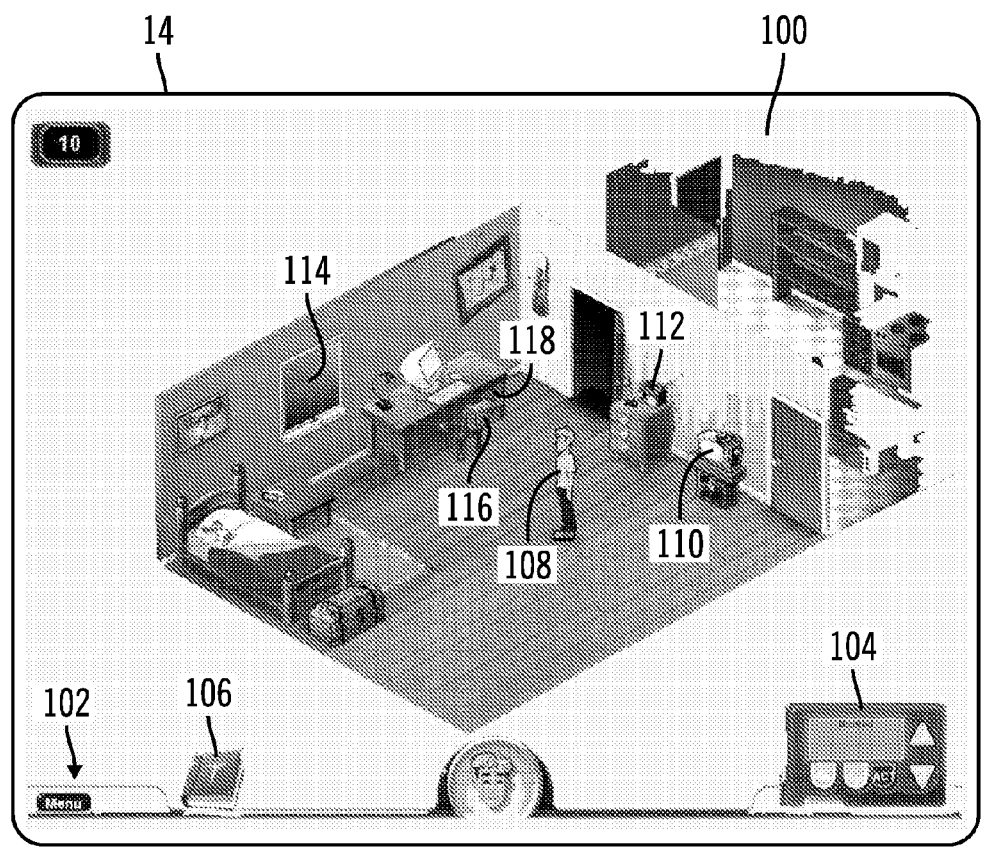
FIGS. 4–10 illustrate an example of the virtual environment in which the virtual patient interacts in accordance with implementations of the invention.

FIGS. 4–10 provide illustrations of examples of the virtual environment the simulation program 10 generates and renders in different scenes where the virtual patient 54 is an adolescent diabetic. FIG. 4 illustrates an initial scene 100 the simulation program 10 renders within the monitor 14. The interface controls 102 include a representation of an insulin pump 104 as well as an information icon 106 to enable the user to access information about insulin therapy. The user may use the input device(s) 16 to control the movement of the virtual character 108 throughout the room of the initial scene 100 to gather selectable items 70 (FIG. 3). The foreshadowing elements include the displayed television 110, radio 112, and window 114 (which may be opened to view weather information) to provide information foreshadowing the environment in future scenes. Selectable items 70 include the backpack 116 and the drawers 118, which the program user may select to access other selectable items 70. In this way, selectable items may be included within other selectable items.

Figure 5:
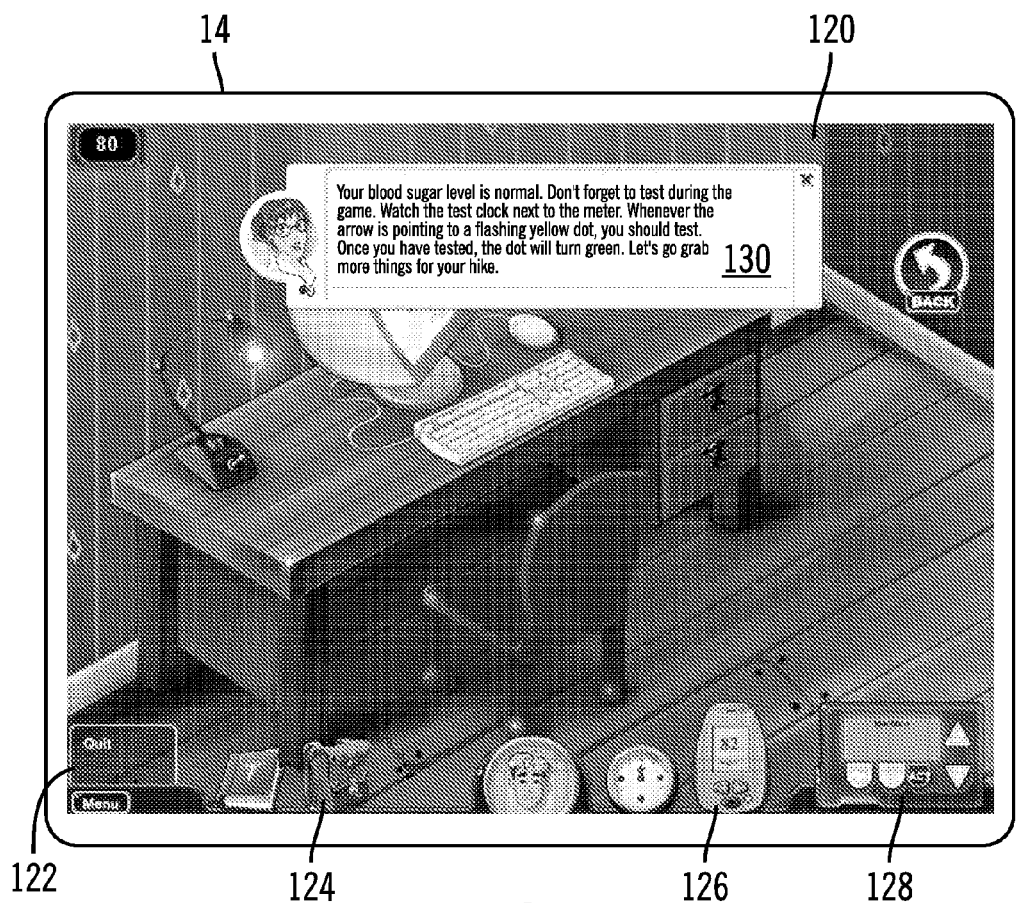

FIG. 5 illustrates a scene 120 that the simulation program 10 generates and renders when the user selects the backpack 116 from the initial scene 100 (FIG. 4). Upon selection of the backpack 116, the simulation program 10 displays the selected backpack as a gathered item 124 in the interface controls 122. Further displayed is a blood-sugar meter 126 the user previously selected or gathered. After selecting the backpack 116 from the initial scene 100 in FIG. 4, scene 120 may be generated and rendered with an information popup 130 providing information on how the program user would use the blood-sugar meter 126 and insulin pump 128.

The simulation program 10 presents the virtual environment of FIGS. 4 and 5 to enable the user to virtually experience through the virtual character 108 (FIG. 4) the actions they would have to perform at home, such as in the morning, when getting ready for the activities outside of the house. Through the virtual environment of FIGS. 4 and 5, the simulation program 10 conveys to program users that they have to gather the blood sugar-level meter but that they do not need to take any insulin injections because the pump is automatically providing insulin. The program user, who may currently be on insulin injection therapy, would realize the benefits of the promoted insulin pump therapy by virtually experiencing that there is no need to receive insulin injections before leaving the house.

Figure 6:
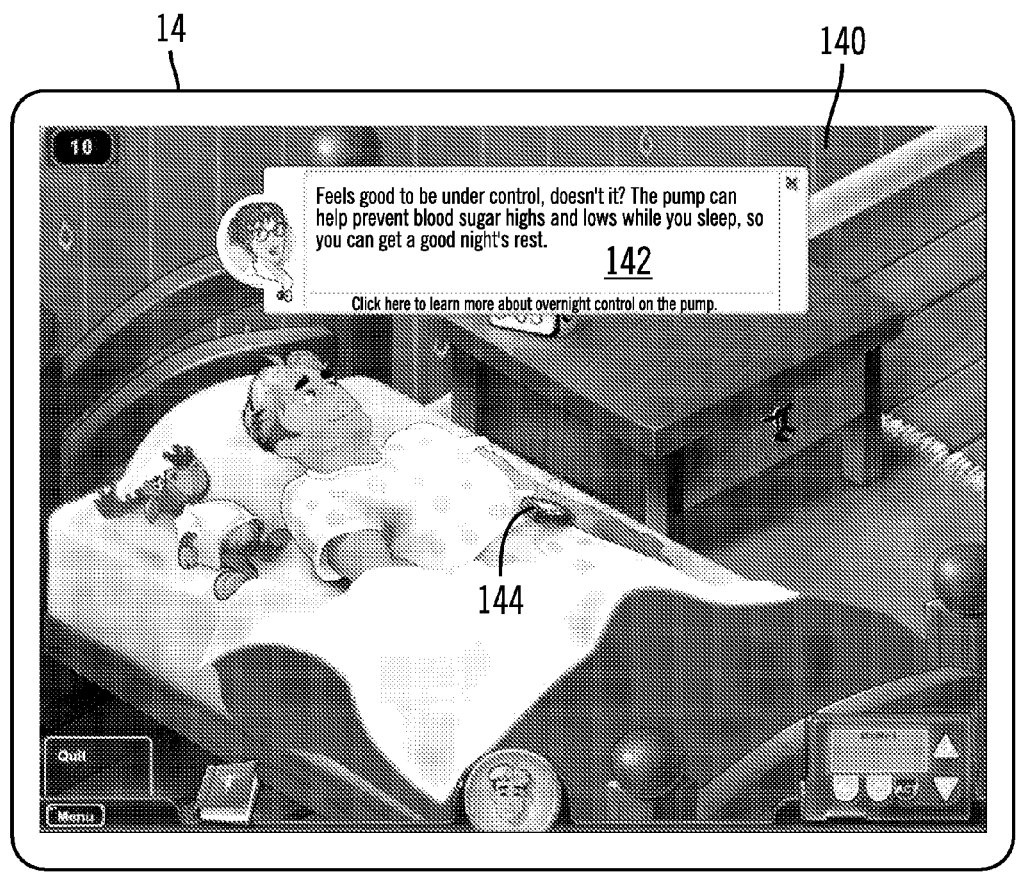

FIG. 6 provides an illustration of a sleep activity scene 140 to demonstrate the benefits of the pump therapy while sleeping. The information pop-up 142 explains the benefits of using the insulin pump 144 to regulate insulin dispensing while asleep in a manner that does not interrupt sleep. Those program users receiving alternative insulin therapies, such as injections, will instantly realize the benefits of using the pump while asleep from the information pop-up 142 presented in the sleep activity scene 140. The sleep activity scene 140 further allows the program user to virtually experience the limited intrusiveness of the pump 144 and how it would not impede sleep due to its small size.

Figure 7:
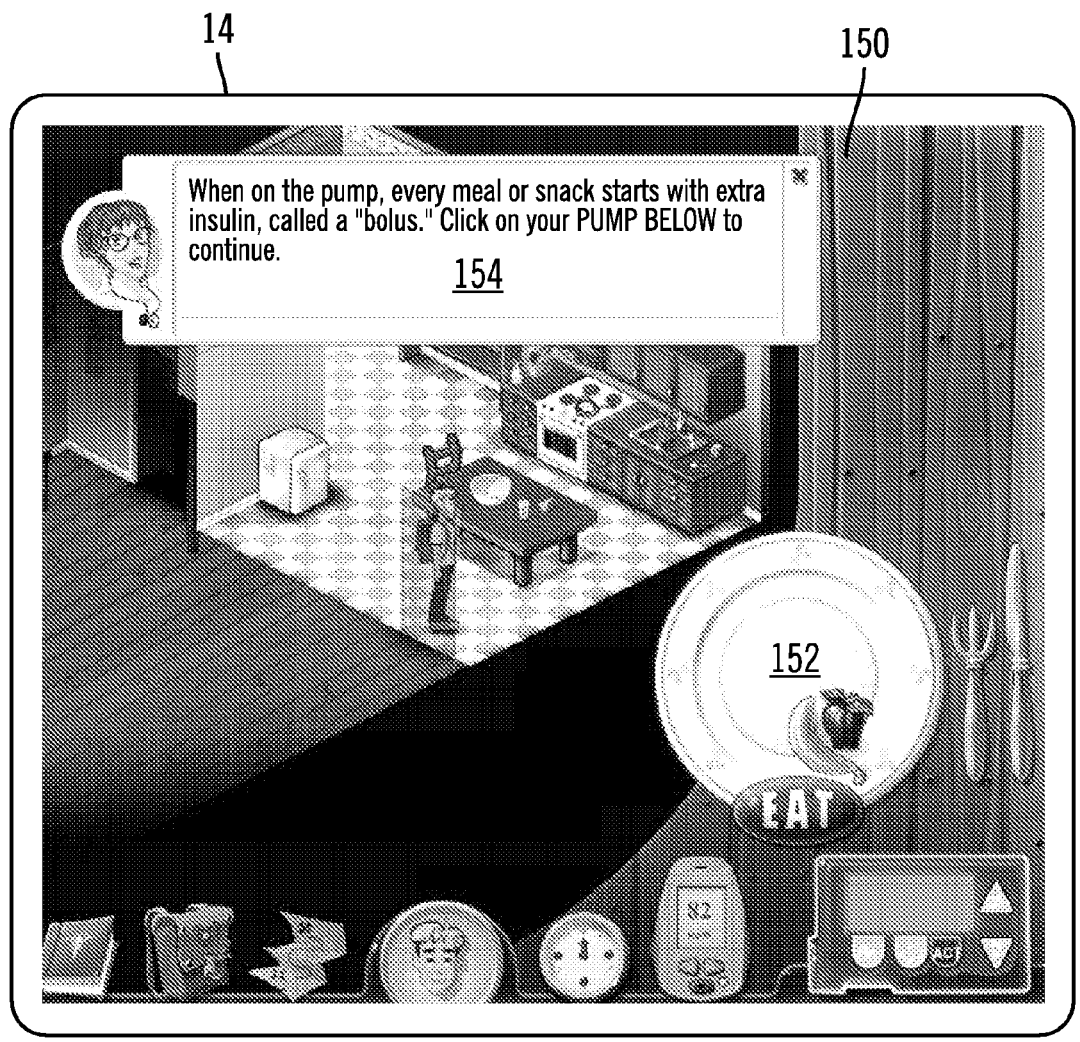

FIG. 7 illustrates a dining scene 150 in which the selectable items comprise food the user may add to a virtual plate 152. When selecting food, the simulation program 10 automatically displays information pop-up 154 to provide information on how the insulin pump operates while eating and impacts dining. The information pop-up 154 explains to the user that the only action that must be taken before eating is an additional insulin adjustment through the pump referred to as a "bolus". Again, this allows the program user to virtually experience the limited intrusiveness of the insulin pump on daily activities.

Figure 8:
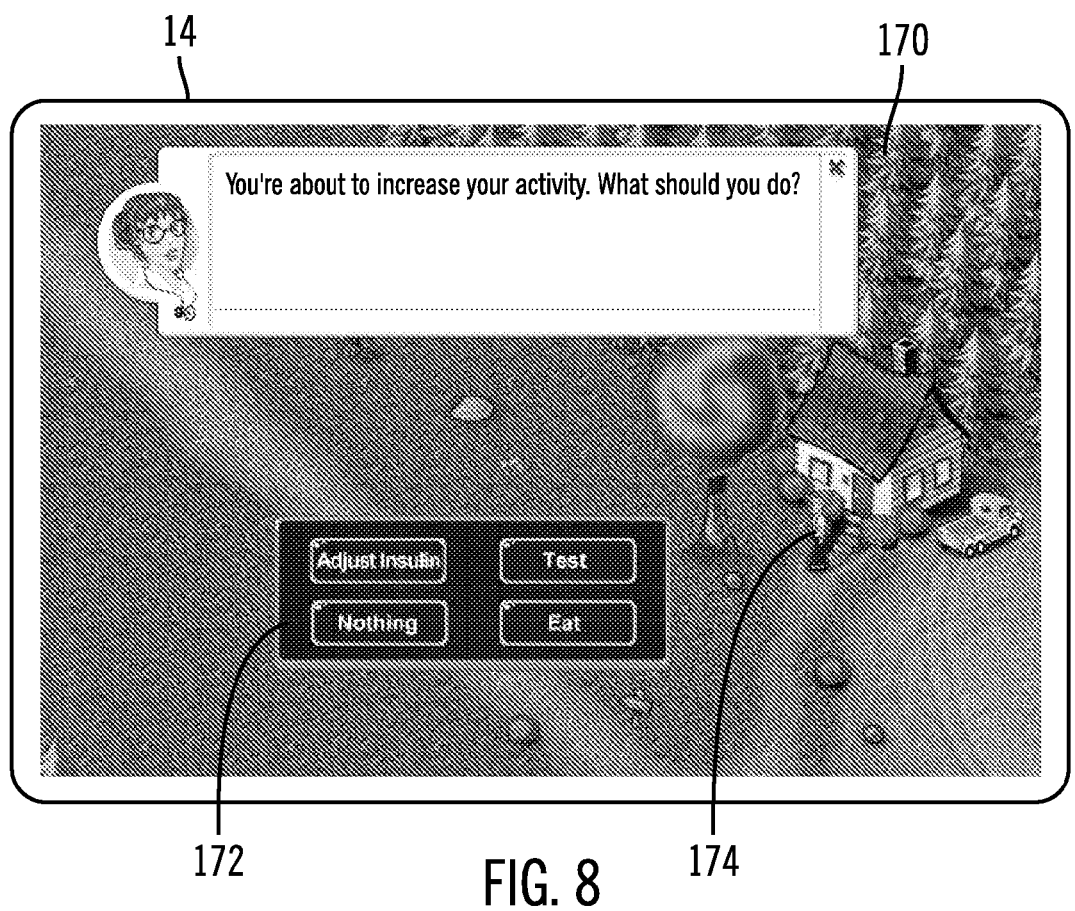

FIG. 8 illustrates a hiking scene 170. Upon the commencement of this scene, an information pop-up 172 is displayed to prompt the program user to take a medical therapy action. The program user may select to test the virtual patient's 174 blood-sugar level and adjust the insulin dispensed through the pump.

Figure 9:
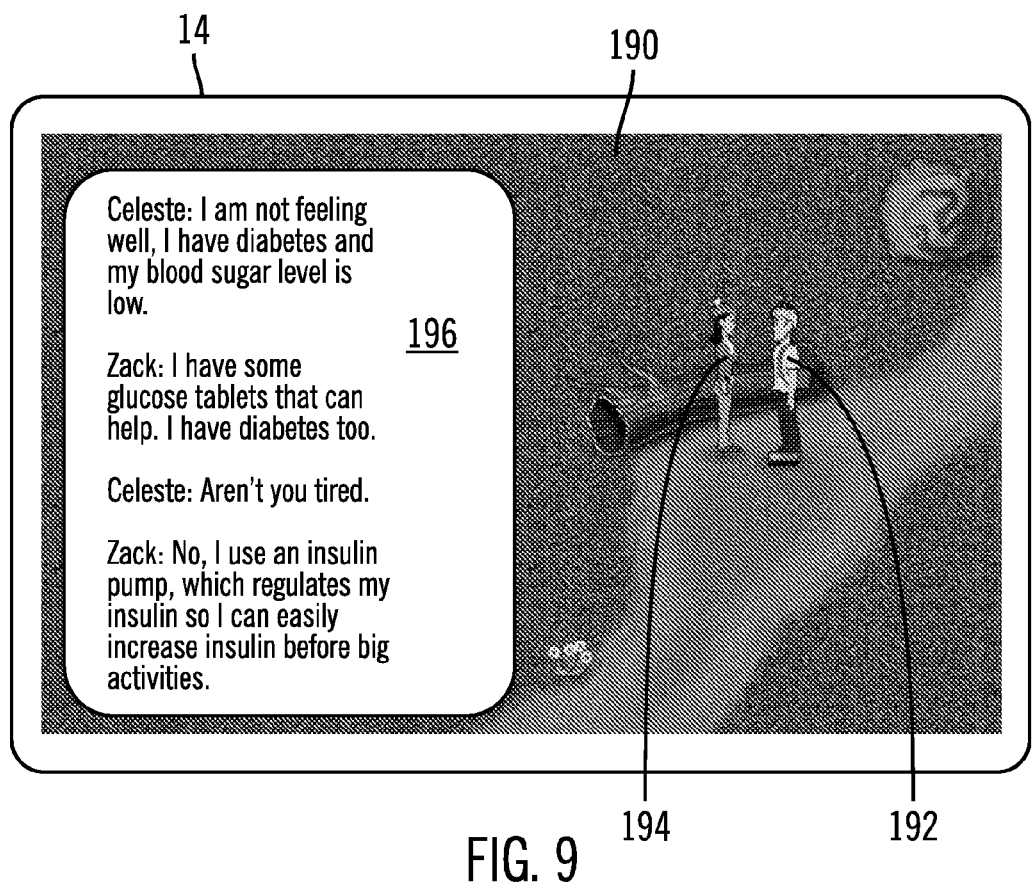

FIG. 9 illustrates an activity scene 190 where the virtual patient 192 encounters a contrast character 194 having diabetes who is not on pump therapy. To emphasize the limitations the contrast character 194 experiences with an alternative therapy, the contrast character 194, referred to as "Celeste", expresses in the dialog box 196 the medical difficulties she is experiencing and the virtual patient 192, referred to as "Zack", is prompted to provide assistance. Through the interaction with the contrast character 194, the user is reminded of limitations of other non-pump insulin therapies, which the program user may be currently using, but that do not provide the convenience of a pump.

Figure 10:
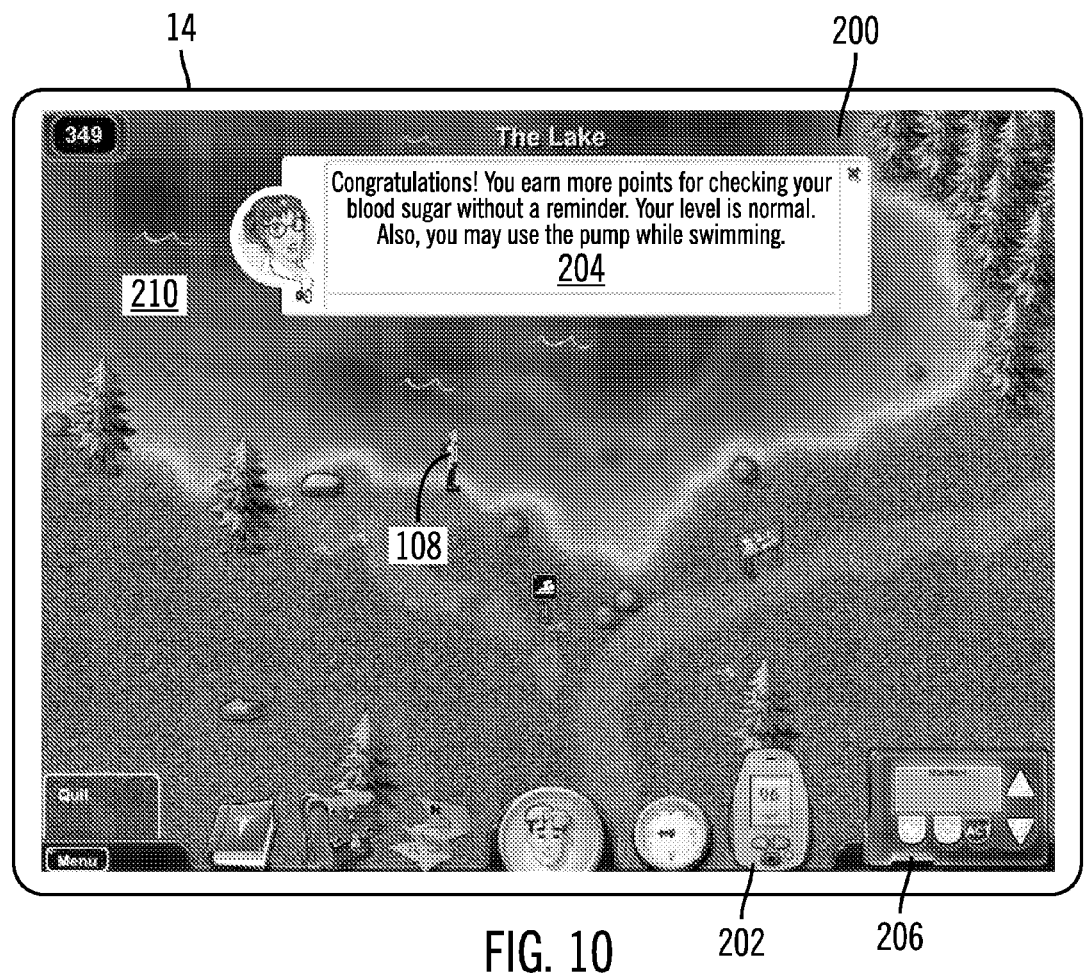

FIG. 10 illustrates a swim scene 200. If the user selects the blood-sugar meter 202 without being prompted or reminded by the simulation program 10, then the simulation program 10 generates and renders behavioral reinforcement pop-up 204 to provide points and incentives for the user to continue to proactively monitor the blood-sugar level and adjust the insulin pump 206 if necessary. In this way, the program user experiences through the virtual patient 208 the knowledge that before doing an activity like swimming, a program user simply needs to test the blood-sugar level and then adjust the pump if necessary. A program user who has diabetes and is currently on an injection therapy will recognize that this is an important improvement over limitations of current injection therapy. If the program user moves the virtual patient 208 to the displayed lake 210, then the simulation program 10 may generate and render a swim arcade in which the user would engage in action oriented play for entertainment purposes. Upon participating in the swim arcade, further information may be presented on using the pump while swimming. The reinforcement pop-up 204 further provides information on the benefits of the pump when engaged in the activity that is the subject of the scene, such as being able to swim with the insulin pump.

Figure 11:
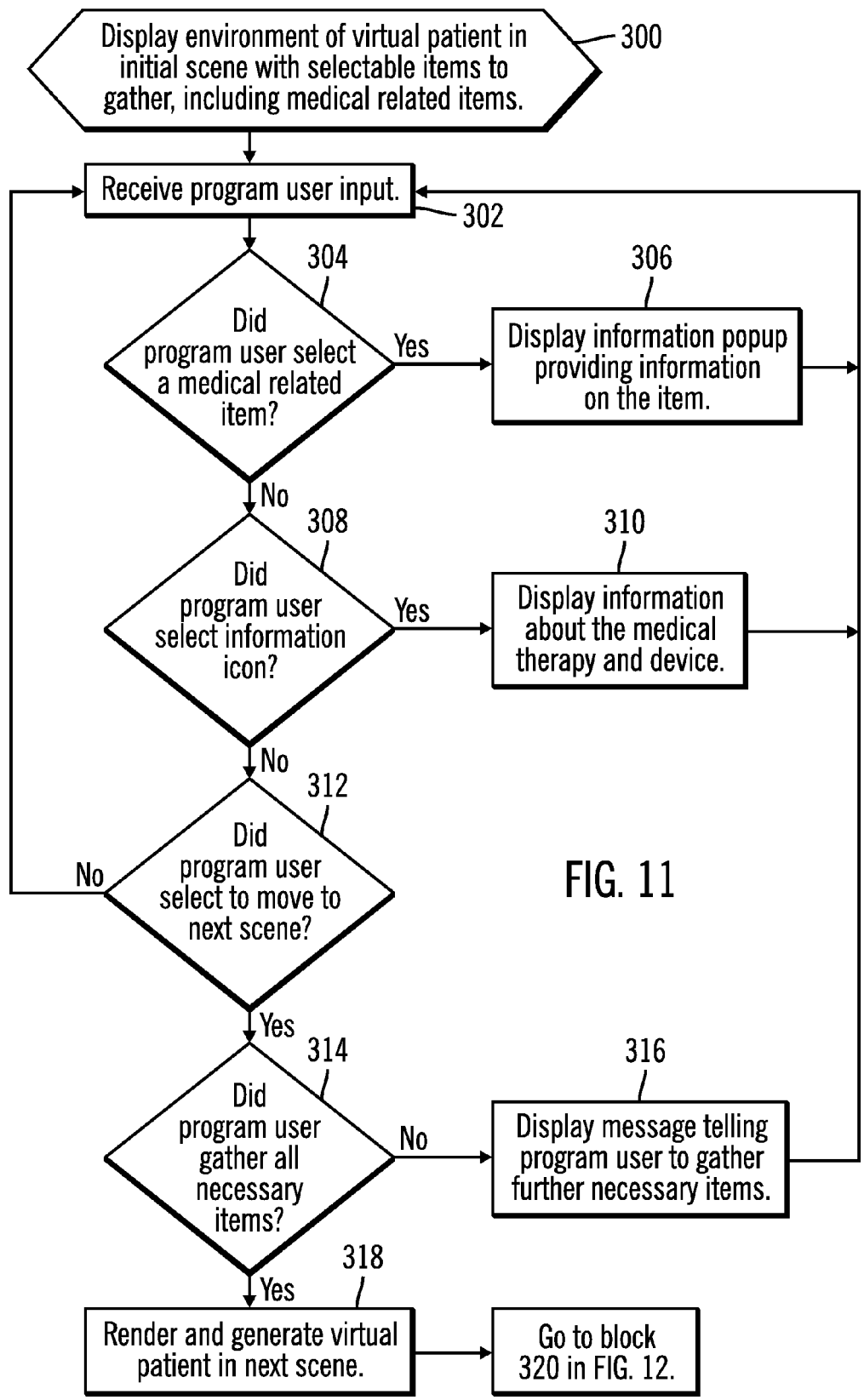
FIGS. 11 and 12 illustrate operations performed by a computer simulation program to implement the virtual environment in which the virtual patient interacts in accordance with implementations of the invention.
Figure 12:
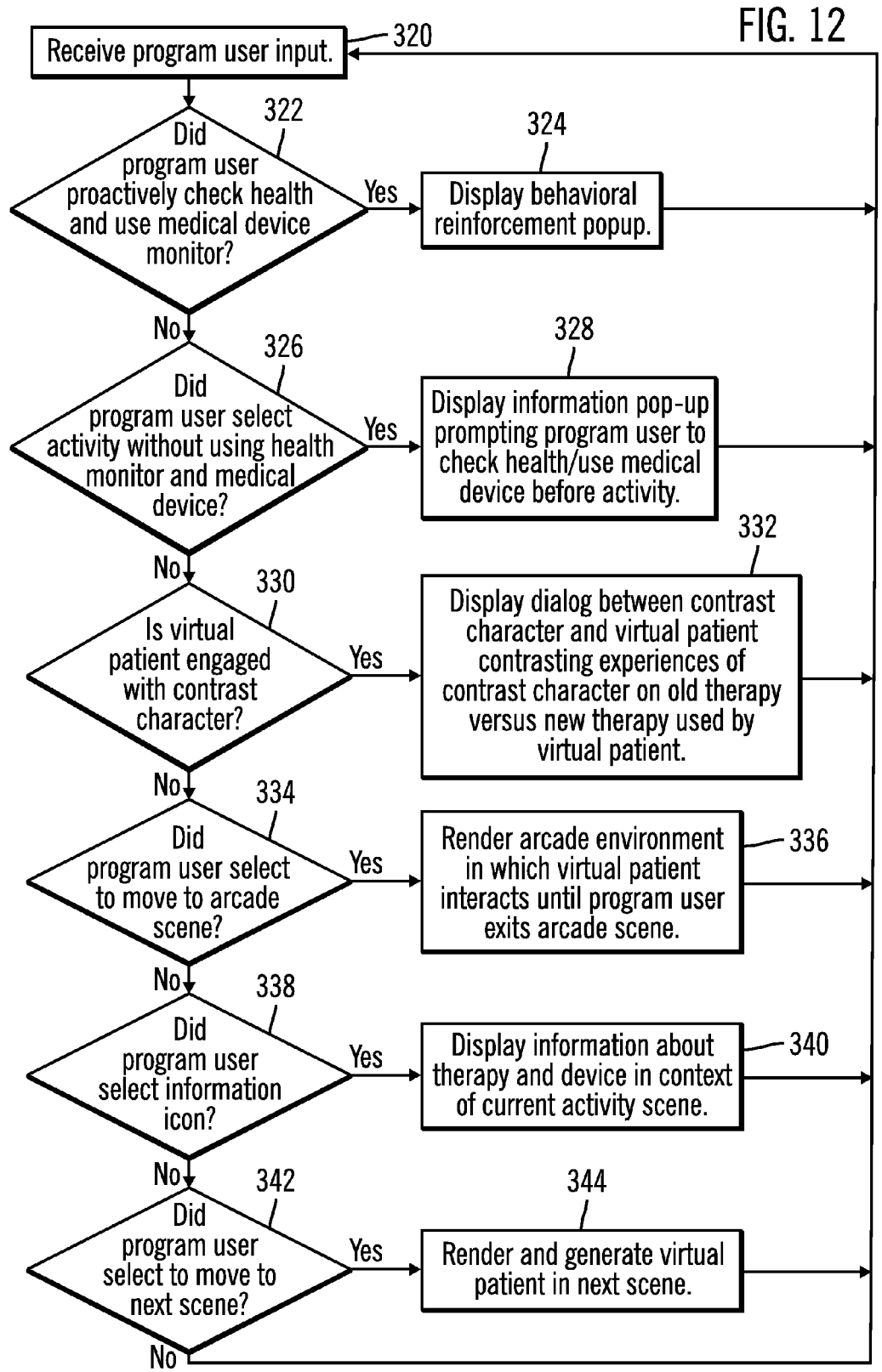

FIGS. 11 and 12 provide an example of the game flow operations implemented by the simulation program 10 to allow the user to virtually experience the impact of the promoted medical therapy on the daily activities of the virtual patient 54 (FIG. 3) that is using the promoted medical therapy. With respect to FIG. 11, the simulation program 10 begins by generating and rendering (at block 300) a virtual environment 50 including the virtual patient 54 in the initial scene 30 (FIG. 2), including medical related items. Upon receiving (at block 302) program user input via the input device 16, if (at block 304) the program user selected a medical related item, then the simulation program 10 renders display information to cause the display (at block 306) of an information pop-up 76 providing information on the selected medical item, such as operating instructions. If (at block 308) the program user selected the help information icon 64, then the simulation program 10 renders (at block 310) display information to cause the display of information describing the medical therapy or the medical device 56. From block 306 or 310, control proceeds back to block 302 to await further user input. If (at block 312) the program user selected to move to a next activity scene 32*a* (FIG. 2), then the simulation program 10 determines (at block 314) whether the program user had gathered all selectable item(s) 70 (FIG. 3) required before the user can proceed to the next activity scene 32*a*. The selectable items 70 may comprise a health monitor 58 and other medications and components related to the medical therapy, as well as general items unrelated to the medical therapy, such as clothing, etc. If (at block 314) the program user did not gather all necessary items, which would be displayed as the gathered item(s) 60 in the interface controls 52, then the simulation program 10 renders (at block 316) information notifying the user to gather further necessary items; otherwise, the simulation program 10 generates and renders (at block 318) the virtual patient 54 in the first activity scene 32*a*, along with all the display elements of the next scene 32*a*.

With respect to FIG. 12, upon receiving (at block 320) program user input, if (at block 322) the program user proactively selected to use the health monitor 58 to check the virtual patient's 54 health condition and use the virtual medical device 56, then the simulation program 10 renders (at block 324) display information to cause the display of a behavioral reinforcement pop-up 78 providing encouraging comments concerning the program user's proactive effort to check health and perhaps awarding points which may be added to the point counter 62 to reinforce such behavior during various daily activities virtually portrayed in the activity scenes 32*a*, 32*b* . . . 32*n* (FIG. 2). If (at block 326) the program user selected to proceed to an activity in the current activity scene 32*a*, 32*b* . . . 32*n* without using the health monitor 58 and medical device 56, then the simulation program 10 renders (at block 328) display information to cause the display of an information pop-up 76 prompting the user to select the health monitor 58 and medical device 56 before proceeding to the selected activity. If (at block 330) the program user causes the virtual patient 54 to engage with the contrast character 80, then the simulation program 10 renders (at block 332) display information to cause the display of a display dialog between the contrast character 80 and the virtual patient 54 to provide information contrasting the experiences of the contrast character 80 receiving the old therapy, which the program user is in fact likely receiving, with the benefits of the new medical therapy promoted by the simulation program 10.

If (at block 334) the program user selected to move to an arcade scene 34 (FIG. 2), then the simulation program 10 renders (at block 336) display information to cause the display of an arcade virtual environment in which the virtual patient 54 interacts until the program user exits the arcade scene 34. As discussed, the arcade environment may involve some form of action entertainment that may not be related to the medical therapy. If (at block 338) the program user selected the information icon 64, then the simulation program 10 renders (at block 340) information about the medical therapy and the medical device 56 in the context of the current activity scene. For instance, if the program user selects information icon 64 during the rendering of the swim scene (FIG. 10), then the rendered information would concern use of the medical device 56 while swimming. If (at block 342) the user selected to move to the next scene, then the simulation program 10 renders and generates (at block 344) the virtual character 54 in the next scene. From blocks 324, 328, 332, 336, 340, 344, and the no branch of block 342, control proceeds back to block 320 to await further program user input.

The described implementations provide a virtual environment 50 in which the program user controls a virtual patient 54 (FIG. 3) receiving a medical therapy being promoted through the simulation program 10. The rendering of the different scenes and the interactions of the virtual patient 54 therein allow the program user to understand and virtually experience the benefits and advantages of the promoted medical therapy and medical device. Further, the described virtual environment 50 allows the user to virtually experience different daily activities and how the medical therapy/device will improve the lifestyle and quality of life for the program user suffering from the medical condition.

Additional Implementation Details

The simulation program disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

FIGS. 4–10 illustrate example scenes of the virtual environment in which the virtual patient would interact. However, any number of different scenes and elements within the scenes may be deployed when implementing the virtual environment.

The described implementations concern using a simulation computer program to allow a program user to virtually experience how a medical therapy and device will impact the program user's life for the better. In alternative implementations, the simulation program described herein may be used for promoted devices and services other than medical therapies to allow program users to virtually experience how a service or product will positively impact their daily lives. For instance, the simulation program may enable the program user to virtually experience how a promoted product will impact certain daily activities rendered in the virtual environment. Still further, the virtual customer may interact with a contrast character who is not using the promoted product or is using a competing product to further understand the benefits of the promoted product.

FIGS. 11 and 12 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method implemented by a computer program for providing training information to a user on a display executed by a computer on using a medical therapy to treat a medical condition, comprising:

displaying a virtual environment;

displaying a user controlled virtual patient within the virtual environment, wherein the user controlled virtual patient is simulating receiving the medical therapy and simulating real life activity in the virtual environment;

receiving input control signals from the user controlling movement of the user controlled virtual patient through the virtual environment;

rendering interactions between the user controlled virtual patient and the virtual environment in response to the input control signals to enable the user to virtually engage in a simulated daily activity through the actions of the user controlled virtual patient, wherein the simulated daily activity is other than simulated receiving of the simulated medical therapy;

displaying a virtual patient not controlled by the user and receiving an alternative simulated medical therapy to treat the same medical condition of the user controlled virtual patient;

rendering interactions between the user controlled virtual patient and the non-user controlled virtual patient to convey information demonstrating how the non-user controlled virtual patient is less able to engage in same simulated daily activities experienced by the user controlled virtual patient as a result of the alternative simulated medical therapy the non-user controlled virtual patient is receiving versus the simulated medical therapy the user controlled virtual patient is receiving; and displaying information on how the simulated medical therapy positively impacts the user controlled virtual patient engaged in the simulated daily activities in the virtual environment to promote the simulated medical therapy for the user to treat the medical condition in real life.

2. The method of claim 1, wherein the simulated medical therapy involves use of a medical device to dispense medication, further comprising:

displaying a representation of the medical device; and receiving input control signals from the user to simulate dispensing medication from the displayed medical device when the user controlled virtual patient is interacting in the virtual environment.

3. The method of claim 2, wherein the medical device comprises an insulin pump and wherein the medical condition comprises diabetes.

4. The method of claim 1, further comprising:

prompting the user to check a health state of the user controlled virtual patient in response to receiving user input control signals to cause the user controlled virtual patient to perform the simulated daily activity;

receiving user input control signals to check the health state of the user controlled virtual patient; and displaying information on the health state.

5. The method of claim 4, further comprising:

after receiving user input control signals to check the health state, displaying information on applying the simulated medical therapy.

6. The method of claim 4, wherein receiving user input control signals to check the health state comprises:

receiving user input control signals to use a virtual health meter to measure a simulated biometric parameter of the user controlled virtual patient;

determining whether the measured biometric parameter requires application of the simulated medical therapy; and prompting the user to apply the simulated medical therapy after determining that application of the simulated medical therapy is required.

7. The method of claim 1, further comprising:
receiving user input control signals to check a health state before the user directs the user controlled virtual patient to perform the simulated daily activity; and
displaying information on checking the health state in response to the user input control signals to check the health state.

8. The method of claim 7, wherein displaying the information further comprises displaying positive reinforcement to the user for checking the health state before performing the simulated daily activity.

9. The method of claim 8, further comprising:
displaying positive reinforcement to the user for proactively engaging in positive behavior unrelated to the simulated medical therapy.

10. The method of claim 1 wherein the medical condition is diabetes, wherein the simulated medical therapy received by the user controlled virtual patient comprises insulin pump therapy and wherein the alternative simulated medical therapy received by the non-user controlled virtual patient comprises insulin injections.

11. The method of claim 1, wherein one scene of the displayed virtual environment includes simulated medical items related to the simulated medical therapy that the user must cause the user controlled virtual patient to gather for use in subsequent scenes of the virtual environment.

12. The method of claim 1, wherein displaying the virtual environment comprises:
displaying a plurality of scenes, wherein the scenes include the simulated daily activities of the user controlled virtual patient that are capable of being impacted by the simulated medical therapy.

13. The method of claim 1, wherein the simulated daily activity comprises an athletic activity.

14. The method of claim 1, wherein the rendered interactions between the non-user controlled virtual patient and user controlled virtual patient comprise a predefined dialog or are performed in response to user controls.

15. The method of claim 1, wherein the simulated daily activity comprises sleeping.

16. A system for providing training information to a user of the system on using a simulated medical therapy to treat a medical condition, comprising:
a display for displaying information;
means for displaying a virtual environment;
means for displaying a user controlled virtual patient within the virtual environment, wherein the user controlled virtual patient is simulating receiving the simulated medical therapy and simulating real life activity in the virtual environment;
means for receiving input control signals from the user controlling movement of the user controlled virtual patient through the virtual environment;
means for rendering interactions between the user controlled virtual patient and the virtual environment in response to the input control signals to enable the user to virtually engage in a simulated daily activity through the actions of the user controlled virtual patient, wherein the simulated daily activity is other than simulating receiving of the simulated medical therapy;
means for displaying a non-user controlled virtual patient not controlled by the user and receiving an alternative simulated medical therapy to treat the same medical condition of the user controlled virtual patient;
means for rendering interactions between the user controlled virtual patient and the non-user controlled virtual patient to convey information demonstrating how the non-user controlled virtual patient is less able to engage in same simulated daily activities experienced by the user controlled virtual patient as a result of the alternative simulated medical therapy the non-user controlled virtual patient is receiving versus the simulated medical therapy the user controlled virtual patient is receiving; and
means for displaying information on how the simulated medical therapy positively impacts the user controlled virtual patient engaged in the simulated daily activities in the virtual environment to promote the simulated medical therapy for the user to treat a medical condition in real life.

17. The system of claim 16, wherein the simulated medical therapy involves use of a medical device to dispense medication, further comprising:
means for displaying a representation of the medical device; and
means for receiving input control signals from the user to simulate dispensing medication from the displayed medical device when the user controlled virtual patient is interacting in the virtual environment.

18. The system of claim 17, wherein the medical device comprises an insulin pump and wherein the medical condition comprises diabetes.

19. The system of claim 16, further comprising:
means for prompting the user to check a health state of the user controlled virtual patient in response to receiving user input control signals to cause the user controlled virtual patient to perform the simulated daily activity;
means for receiving user input control signals to check the health state of the user controlled virtual patient; and
means for displaying information on the health state.

20. The system of claim 16, further comprising:
means for receiving user input control signals to check a health state before the user directs the user controlled virtual patient to perform the simulated daily activity; and
means for displaying information on checking the health state in response to the user input control signals to check the health state.

21. The system of claim 20, wherein the means for displaying the information further renders positive reinforcement to the user for checking the health state before performing the simulated daily activity.

22. The system of claim 21, further comprising:
means for displaying positive reinforcement to the user for proactively engaging in positive behavior unrelated to the simulated medical therapy.

23. The system of claim 16, wherein the medical condition is diabetes, wherein the simulated medical therapy received by the user controlled virtual patient comprises insulin pump therapy and wherein the alternative simulated medical therapy received by the non-user controlled virtual patient comprises insulin injections.

24. The system of claim 16, wherein the means for displaying the virtual environment further performs:
displaying a plurality of scenes, wherein the scenes include the simulated daily activities of the user controlled virtual patient that are capable of being impacted by the simulated medical therapy.

25. The system of claim 16, wherein the simulated daily activity comprises an athletic activity.

26. The system of claim 16, wherein the rendered interactions between the non-user controlled virtual patient and user controlled virtual patient comprise a predefined dialog or are performed in response to user controls.

27. The system of claim 16, wherein the simulated daily activity comprises sleeping.

28. An article of manufacture for providing training information to a user of the article of manufacture on a display on using a simulated medical therapy to treat a medical condition, wherein the article of manufacture causes operations to be performed, the operations comprising:

displaying a virtual environment;

displaying a user controlled virtual patient within the virtual environment, wherein the user controlled virtual patient is simulating receiving the simulated medical therapy and simulating real life activity in the virtual environment;

receiving input control signals from the user controlling movement of the user controlled virtual patient through the virtual environment;

rendering interactions between the user controlled virtual patient and the virtual environment in response to the input control signals to enable the user to virtually engage in a simulated daily activity through the actions of the user controlled virtual patient, wherein the simulated daily activity is other than simulated receiving of the simulated medical therapy;

displaying a non-user controlled virtual patient not controlled by the user and receiving an alternative simulated medical therapy to treat the same medical condition of the user controlled virtual patient;

rendering interactions between the user controlled virtual patient and the non-user controlled virtual patient to convey information demonstrating how the non-user controlled virtual patient is less able to engage in same simulated daily activities experienced by the user controlled virtual patient as a result of the alternative simulated medical therapy the non-user controlled virtual patient is receiving versus the simulated medical therapy the user controlled virtual patient is receiving; and displaying information on how the simulated medical therapy positively impacts the user controlled virtual patient engaged in the simulated daily activities in the virtual environment to promote the simulated medical therapy for the user to treat a medical condition in real life.

29. The article of manufacture of claim 28, wherein the simulated medical therapy involves use of a medical device to dispense medication, further comprising:

displaying a representation of the medical device; and receiving input control signals from the user to simulate dispensing medication from the displayed medical device when the user controlled virtual patient is interacting in the virtual environment.

30. The article of manufacture of claim 29, wherein the medical device comprises an insulin pump and wherein the medical condition comprises diabetes.

31. The article of manufacture of claim 28, further comprising:

prompting the user to check a health state of the user controlled virtual patient in response to receiving user input control signals to cause the user controlled virtual patient to perform the simulated daily activity;

receiving user input control signals to check the health state of the user controlled virtual patient; and displaying information on the health state.

32. The article of manufacture of claim 31, further comprising:

after receiving user input control signals to check the health state, displaying information on applying the simulated medical therapy.

33. The article of manufacture of claim 31, wherein receiving user input control signals to check the health state comprises:

receiving user input control signals to use a virtual health meter to measure a biometric parameter of the user controlled virtual patient;

determining whether the measured biometric parameter requires application of the simulated medical therapy; and prompting the user to apply the simulated medical therapy after determining that application of the simulated medical therapy is required.

34. The article of manufacture of claim 28, further comprising:

receiving user input control signals to check a health state before the user directs the user controlled virtual patient to perform the simulated daily activity; and displaying information on checking the health state in response to the user input control signals to check the health state.

35. The article of manufacture of claim 34, wherein displaying the information further comprises displaying positive reinforcement to the user for checking the health state before performing the simulated daily activity.

36. The article of manufacture of claim 35, further comprising:

displaying positive reinforcement to the user for proactively engaging in positive behavior unrelated to the simulated medical therapy.

37. The article of manufacture of claim 28, wherein the medical condition is diabetes, wherein the simulated medical therapy received by the user controlled virtual patient comprises insulin pump therapy and wherein the alternative simulated medical therapy received by the non-user controlled virtual patient comprises insulin injections.

38. The article of manufacture of claim 28, wherein one scene of the displayed virtual environment includes simulated medical items related to the simulated medical therapy that the user must cause the user controlled virtual patient to gather for use in subsequent scenes of the virtual environment.

39. The article of manufacture of claim 28, wherein rendering the virtual environment comprises:

displaying a plurality of scenes, wherein the scenes include the simulated daily activities of the user controlled virtual patient that are capable of being impacted by the simulated medical therapy.

40. The article of manufacture of claim 28, wherein the simulated daily activity comprises an athletic activity.

41. The article of manufacture of claim 28, wherein the rendered interactions between the non-user controlled virtual patient and user controlled virtual patient comprise a predefined dialog or are performed in response to user controls.

42. The article of manufacture of claim 28, wherein the simulated daily activity comprises sleeping.

* * * * *